Aug. 21, 1928.
F. N. CONNET
1,681,762
PROPORTIONATE METER
Filed Sept. 8, 1924
2 Sheets-Sheet 2
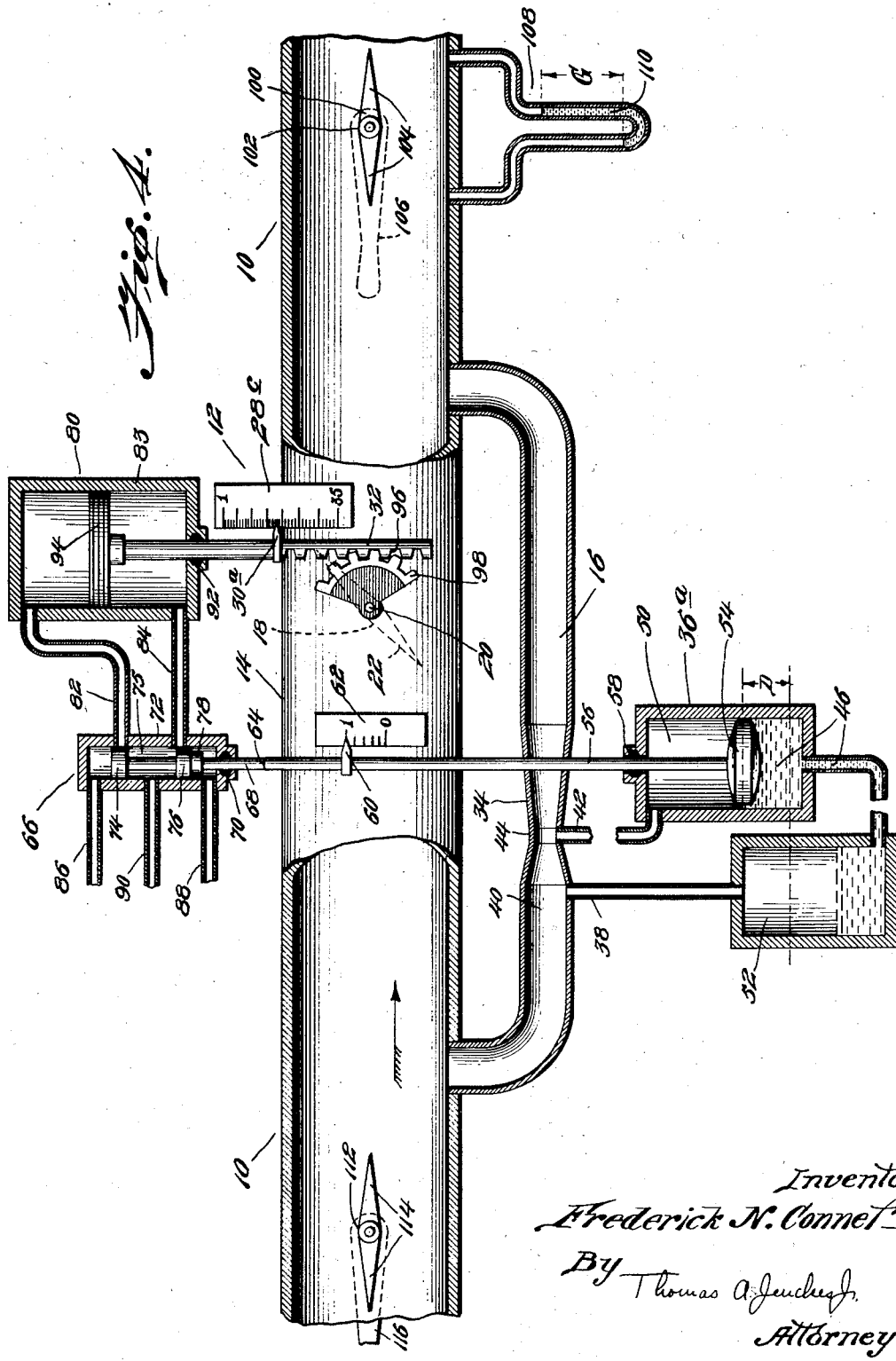
Inventor
Frederick N. Connet
By Thomas A. Jenckes Jr.
Attorney Patented Aug. 21, 1928.

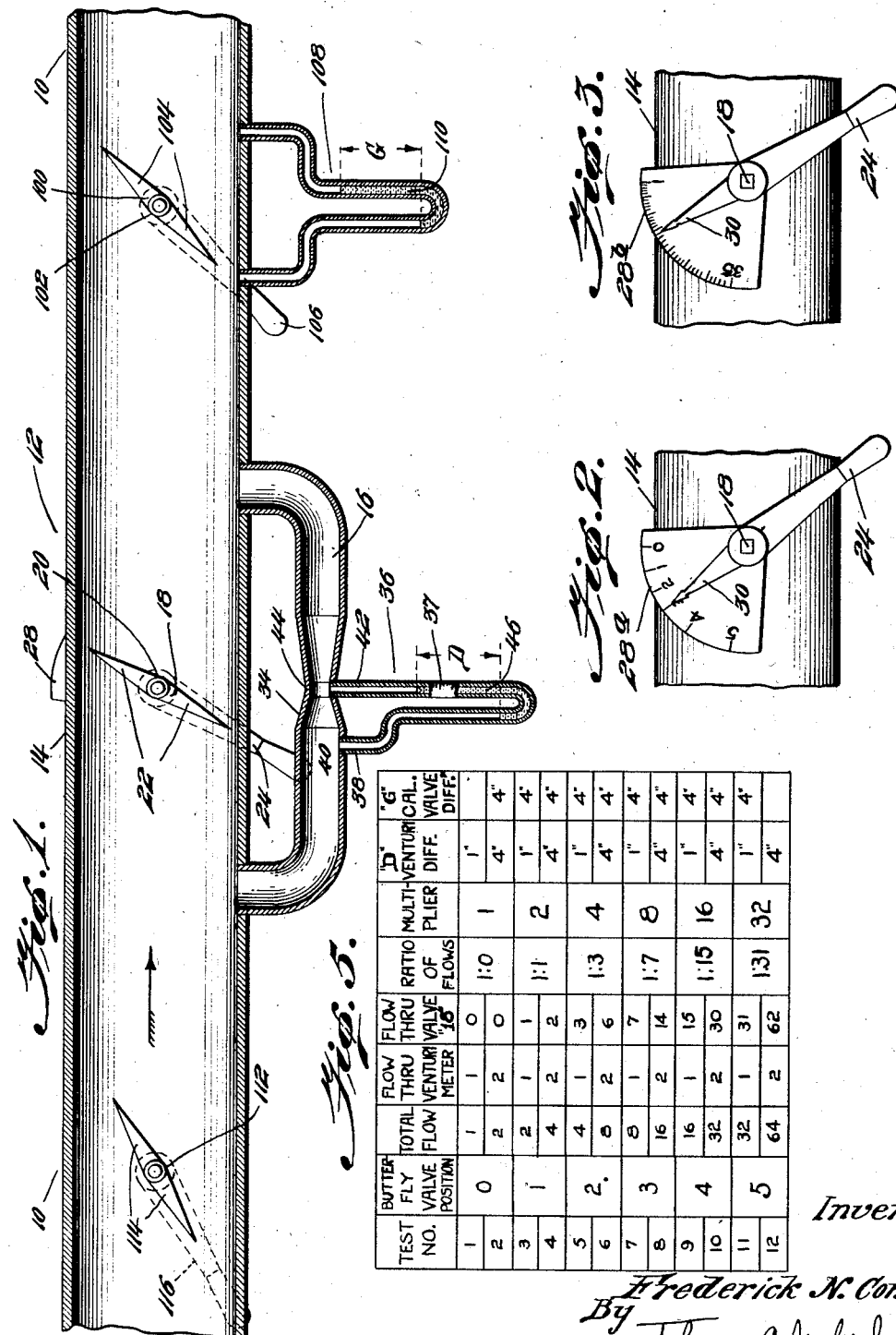

1,681,762

UNITED STATES PATENT OFFICE.

FREDERICK N. CONNET, OF PROVIDENCE, RHODE ISLAND, ASSIGNOR TO BUILDERS IRON FOUNDRY, OF PROVIDENCE, RHODE ISLAND, A CORPORATION OF RHODE ISLAND.

PROPORTIONATE METER.

Application filed September 8, 1924. Serial No. 736,578.

My invention relates to meters for metering the rate of flow of a fluid in a conduit especially of the type wherein the flow of fluid is proportioned between the main line and a line connected in shunt therewith containing an inferential meter of the differential type.

The main object of my invention is to enable a small meter to meter a large volume of flow. In many cases due to construction difficulties it is impossible to attach a large meter tube such as a Venturi meter tube to the conduit. In cases like this a meter containing a proportioning valve and a shunt tube with a small inferential meter with pressure differential indicating means attached can be readily connected. Especially where large conduits are employed this type of meter is much cheaper and easier to install than a large differential producer, and its indicating mechanism is correspondingly reduced in size, hence lessening the cost.

A further object of my invention is to provide a meter of this type which adjusts itself automatically with varying changes in flow so that the calibrated proportioning valve may indicate the total rate of flow.

A further object of my invention is to provide an improved method of metering fluids especially in large conduits and inaccessible places.

A further object of my invention is to provide an improved method of calibrating a meter of this type.

These and such other objects of my invention as may hereinafter appear will be best understood from a description of the embodiments thereof shown in the accompanying drawings.

In the drawings, Fig. 1 is a diagrammatical sectional view showing an embodiment of my invention, wherein the proportioning valve is manually adjustable.

Fig. 2 is a scale attached to the proportioning valve for use in one method of using the embodiment of my invention shown in Fig. 1.

Fig. 3. is a side elevation of a scale used on the proportioning valve with a different method of using the embodiment of my invention shown in Fig. 1.

Fig. 4 is a detailed view partially shown in section of an embodiment of my invention which is automatically adjustable of itself to indicate the total amount of flow.

Fig. 5 is a view of a calibration table sheet illustrating the ratios of flow for different valve positions.

In the drawings, wherein like characters of reference indicate like parts throughout, 10 generally represents a conduit through which the fluid is flowing in the direction of the arrow. 12 generally indicates my improved meter. 14 indicates the main pipe line of my meter which, as in the embodiment shown, is preferably integral with the conduit 10. 16 indicates a shunt line of smaller diameter attached to said main line at convenient points adjacent to the conduit 10. I provide adjustable means to produce a variable resistance in said main line 14 between the terminals of said shunt line 16 which in the embodiment shown comprises the flow proportioning valve 18 suitably pivoted to the sides of the main line 14, as at 20, and having the butterfly vane 22 adapted to completely shut off the flow of fluid through said main line 14 when said valve 18 is shut. In the embodiment shown in Figs. 1, 2, and 3 I provide said valve 18 with the operating handle 24 for convenient adjustment thereof. Said valve 18 is preferably calibrated to indicate the proportion of flow between said shunt and main line. Said valve is provided with the scale 28 adjacent thereto one embodiment of said scale being shown as 28$^a$ in Fig. 2. A further embodiment of said scale is shown as 28$^b$ in Fig. 3 and a further embodiment of said scale is shown as 28$^c$ in the automatically adjustable embodiment shown in Fig. 4. A pointer 30 is actuated by the movements of said calibrating valve. In the embodiment shown in Figs. 2 and 3 said pointer 30 is preferably integral with said operating handle 24 whereas in the automatically adjustable embodiment shown in Fig. 4 said pointer 30$^a$ is preferably attached to the piston rod 32 which actuates said proportioning valve 18.

The shunt tube 16 is provided with means to indicate the pressure differential produced therein. While any type of inferential meter may be employed, in the preferred embodiment I have provided the Venturi meter tube 34. Said Venturi meter tube is provided with means to indicate the pressure differential produced thereby, which as shown comprises the manometer 36. In the embodiment shown in Fig. 4 the manometer 36ª is enlarged for a purpose to be described. The manometer 36 has one terminal 38 thereof suitably attached to the inlet 40 of the Venturi tube and the other terminal 42 thereof suitably attached to the throat 44 of the Venturi tube and contains the usual indicating liquid preferably mercury 46.

The automatically adjustable embodiment shown in Fig. 4 differs from the embodiment shown in Fig. 1 in the following particulars, the manometer 36ª thereof is enlarged and divided into two chambers 50 and 52. A float 54 rests on the indicating liquid retained in the enlarged low pressure chamber 50 and a rod 56 projects upward through a stuffing box 58 in the top of said chamber. Said rod has mounted thereon the pointer 60, which is adapted to register on the scale 62 to indicate the total rate of flow when the proportioning valve is shut. To permit said pointer 60 to indicate small rates of flow through the shunt tube alone, said rod 56 is preferably broken as at 64.

As explained, in the embodiment shown in Fig. 4 I provide means actuated by said pressure differential indicating means to automatically adjust the resistance in said main line to produce a constant differential in the shunt line whereby the calibrated adjustable resistance producing means 18 may indicate the proportion of flow through said shunt and main lines so long as the proportioning valve is open. As said means 66 I employ a pilot valve, actuated by the piston rod 56. The upper portion 68 of said rod 56 above where said rod 56 is broken as at 64 as explained extends through the stuffing box 70 into the cylinder 72. The upper end of said rod 68 is provided with a piston head 74, a piston head 76 spaced at a predetermined distance below, and the collar 78 just below the piston head 76 to limit the downward movement of said rod 68.

Adjacent the pilot valve 66 and preferably above the proportioning valve 18 I locate the hydraulic piston 80. A pipe 82 connects the upper portion of the cylinder 72 of said pilot valve 66 with the upper portion of the cylinder 83 of said hydraulic piston 80 and a pipe 84 connects the lower portion of said cylinder 72 of said pilot valve 66 with the lower portion of the cylinder 83 of the hydraulic piston 80. Said pilot valve 66 is provided with two outlet pipes 86 and 88 at the upper and lower ends respectively and the one inlet pipe 90 near the centre thereof. The piston rod 32 projects through a stuffing box 92 in the base of the hydraulic piston 80. Said piston rod 32 is provided with the usual piston head 94 at the upper end thereof to reciprocate in said cylinder 83 and the lower end thereof is provided with the rack 96 adapted to enmesh a gear 98 carried by said proportioning valve 18.

To assist in the calibration of either of my embodiments, I provide means to produce an adustable resistance connected to said conduit 10 in series with said flow proportioning valve variable resistance producing means 18. In the preferred embodiment shown said means comprises the valve 100 suitably pivoted as at 102 to the sides of said conduit 10 and provided with the butterfly vanes 104 and the operating handle 106. Connected to said conduit 10 adjacent to said variable resistance calibrating valve I provide the manometer 108 containing the usual indicating liquid 110.

In my preferred embodiment I provide in addition adjustable means for regulating the rate of flow in said conduit 10 connected in series with said adjustable flow proportioning valve and said adjustable calibrating valve 100. Said adjusting flow controlling means in the embodiment shown comprises the valve 112 suitably pivoted within the conduits 10 above the main line 14, having the vanes 114 and the handle 116 attached thereto.

In order that the functioning of my invention may be more completely understood, I will first describe the improved method I employ of calibrating my invention, referring more especially to the embodiment shown in Fig. 1. It is evident that for any given setting of the valve 18 the flow through the main line 14 will bear a constant ratio to that through the shunt line 16 and Venturi tube 34 contained therein and it is also evident that for any specified opening of the calibrating valve 100 a given flow will produce one differential in the manometer 36. Assuming first that the flow proportioning valve 18 is shut and by adjusting the calibrating valve 100 and control valve 112, if necessary, permit the fluid to flow through the shunt line 14 attached thereto at a rate which will produce a differential "D" of exactly one inch. Since all of the flow then goes through the Venturi tube 34 its value can be determined by the usual Venturi formula. We may call this value 1 unit flow and it can be expressed by gallons per minute, cubic feet per second or in any other unit bearing in mind that the pressure difference varies substantially as the square of the velocity. G represents the differential produced in the manometer 108 attached to the conduit 10 adjacent to the calibrating valve 100. With the flow proportioning valve 18 still closed adjust the calibrating valve 100 and the control valve 112, if necessary until both of the differentials D and G have increased exactly four times. The differential G is not necessarily the same as D but may have any other convenient value which however should be consistent for each pair of tests. We now know from the Venturi formula that since the pressure differential varies as the square of the velocity, the flow through the Venturi meter tube 34 is just two units. Our next step is to open up the proportioning valve 18 until the differential D is reduced to one. We may have to adjust the control valve 112 also because we desire to keep G at exactly four so as to maintain the total flow at exactly two units. We now see that the stream is divided and that one-half goes through the main line 14 and the other half through the shunt line 16. For this setting of the proportioning valve 18 it is obvious that the flow ratio is 1–1 between the line 14 and shunt line 16.

This double set of operations is repeated. The calibrating valve 100 is opened still farther and the control valve 112 adjusted until both differentials are again increased four times. The total flow now is four units one-half going through the main line 14 and the other half going through the shunt line 16. Using the control valve 112 as required to maintain a total flow of four units, the proportioning valve 18 is opened still farther to halve the amount of flow through the shunt tube and to reduce D to one unit, this will make one unit go through the shunt line 16 and since G is four, three units will go through the main line 14. The flow ratio is now 1–3.

This operation is again repeated, the calibrating valve 100 and control valve 112 being again adjusted until the differentials D and G are again increased four times thereby doubling the flow through the shunt tube 16 and since the ratio is 1–3 the flow through the main line 14 will be six units and the total flow eight units. The proportioning valve 18 is again opened until the flow through the shunt line 16 is halved thereby making one unit flow through the shunt line and seven units flow through the main line. This operation may be repeated step by step in like manner until the total flow is 64 units, which is probably a practical limit. It is obvious when the ratio of flow between the shunt line and main line is 1 to 0 that all the flow goes through the Venturi meter and the proper multiplier of the Venturi meter readings to get the total rate of flow is unity, when the flow is equally divided between the shunt and the main lines that the proper multiplier to get the total rate of flow is two, and that when the ratio of flow between the shunt line and main line 16 is one to three that the proper multiplier is four, etc. As shown in Fig. 2 if the corresponding proportioning valve positions be marked 1, 2, 3, 4, 5 etc. we may then find out from the table shown in Fig. 5 the proper multiplier to be used. It is obvious that instead of doubling the flow in the shunt line it may be increased by any known ratio, and instead of halving the flow in the shunt line it may be decreased in any known ratio in this calibrating operation. Having now explained the calibration of my device I will now explain its operation in use. Employing the embodiment shown in Fig. 1 the valve 18 may be set at any one of the calibrating positions as shown in Fig. 2. The manometer 36 may be provided with a scale 37 graduated to register the actual flow through the Venturi tube and the actual reading thereof may be multiplied by the proper multipliers as shown in the table corresponding to the position of the valve to get the total amount of flow. As an alternative method the manometer 36 may be provided with a number of scales the number thereof equal to and calibrated for the varying valve positions as shown calibrated in Fig. 2. The second method of employing the embodiment shown in Fig. 1 is to have a graduated rate of flow scale 28$^b$, (Fig. 3) adjacent to the valve 18 calibrated as just explained to indicate the total rate of flow through both lines at a known constant shunt differential. As the cross sectional areas of said lines are known, it is obvious that the scale 28$^b$ may be as readily calibrated in terms of total flow as in terms of multipliers employing the method of calibration hitherto explained. The valve 18 may then be manually adjusted until the differential D in the manometer 36 is some fixed amount, when the pointer 30 will indicate on the valve scale 28$^b$ the total rate of flow in said shunt and main lines.

In Fig. 4 I show an embodiment of my invention employing the second method wherein means are provided actuated by the pressure differential indicating means to automatically adjust the resistance in said main line to produce a constant differential in the shunt line. The preferred embodiment of said means as shown in Fig. 4 has been hitherto described, and I will now describe its operation. It is obvious where the valve 18 is closed and all the flow passes through the shunt tube 16 that the scale 62 will then measure the rate of flow through the meter when the differential is less than the set value. The rod 56 is broken and the upper portion 68 thereof is provided with the collar 78 adapted to abut the base of the pilot valve cylinder 66 to permit the lower end of the rod 56 to move away from the rod 68 to accomplish this result. When however, the flow through said meter 12 increases beyond the set capacity of said shunt Venturi meter tube 34, the rod 56 will raise up the upper portion 68 thereof, which will raise up the two piston heads 74 and 76, the upper piston head 74 thus rising in the cylinder 66 above the pipe 82 leading into the upper portion of the hydraulic piston cylinder 83 and the piston head 76 above the pipe 84 leading into the lower portion of the hydraulic piston cylinder 83. It is obvious that water may then flow into the pilot valve through the water inlet 90 into the chamber 75 between the piston heads 74 and 76 and through the pipe 82 into the upper portion of the hydraulic cylinder 83 and out of the cylinder 83 through the pipe 84, and out of the pilot valve cylinder 66 through the lower water outlet 88 forcing down the piston head 94 and rod 32 thereof and by means of engagement of the rack 96 with the gear 98 cause the proportioning valve 18 to open in the main line 14, thereby permitting a greater amount of flow therethrough. As an increased amount of flow may go through the main line 14 it is obvious that a decreased amount will go through the shunt line 16 thereby causing the pressure differential D in the manometer 36ª to drop to the desired predetermined position. If the differential D should drop below the desired predetermined position, the portion 68 of the piston rod 56 would drop. This will lower respectively the piston heads 74 and 76, causing the piston head 74 to drop below the opening of the pipe 82 leading from the pilot valve to the upper end of the hydraulic piston cylinder 83 and causing the piston head 76 to drop below the opening of the pipe 84 and hence permitting a flow of water through the water supply pipe 90, chamber 75 of the cylinder 66 of the pilot valve, and pipe 84 into the base of the hydraulic piston cylinder 83. The influx of water in the lower end of the piston cylinder 83 will force up the piston head 94, rod 32 and cause the valve 18 to shut until the desired amount of fluid flows through the shunt tube 16 to produce the desired differential D in the manometer 36ª. It is obvious that the water may flow out of the cylnder 93 through the ppe 82, cylinder 66 and upper waste outlet 86 therein. In Fig. 4 the piston rod 68 is shown in mid position, with the piston heads 74 and 76 shutting off the pipes 82 and 84 respectively, there being no change in the rate of flow of fluid in the conduit 10. It is obvious that when the flow through the conduit 10 falls below the set capacity of the shunt Venturi tube 34 that the collar 78 on the upper piston rod 68 will abut the base of the pilot valve cylinder 66, permitting the lower rod 56 to draw away from the upper portion 68 thereof and register the total flow on the scale 62. As the scale 28ᶜ is calibrated as the scale shown in Fig. 3, it is obvious that the pointer 30ª carried by the rod 32 will register on the scale 28ᶜ the combined flow through the main and shunt lines.

As stated, a main feature of my invention is that the adjustable means to produce a variable resistance in the main line i. e. the adjustable flow proportioning valve 18 is calibrated in some manner to give some indication of the flow in said shunt and main lines, and I therefore in the claims employ the words "calibrated to indicate the flow in said shunt and main lines" to signify that said means or valve is calibrated in some manner so to do, whether it be calibrated to indicate the proportion of flow between said shunt and main lines as in the embodiment shown in Fig. 2, or calibrated as shown in Figs. 3 and 4 to indicate the total rate of flow through said shunt and main lines when the flow through the shunt line is maintained at a predetermined constant or otherwise calibrated to indicate said flow.

It is obvious that I have provided a novel method and apparatus for metering fluids by proportioning their flow, and a novel method of calibrating such an apparatus.

It is understood that my invention is not limited to the specific apparatus shown or processes described and that various deviations may be made therefrom without departing from the spirit and scope of the appended claims.

What I claim as new and desire to obtain by Letters Patent is:

1. A meter for metering the rate of flow of a fluid in a conduit comprising in combination, a main pipe line, a line containing pressure differential producing means connected in shunt thereto, adjustable means to produce a variable resistance in said main line between the terminals of said shunt line to proportion the flow between said shunt and main lines calibrated to indicate the flow in said shunt and main lines, means responsive to the pressure differential produced in said shunt line, means actuated by said pressure differential responsive means to automatically adjust said flow proportioning means to regulate the resistance in said main line to produce a constant differential in the shunt line whereby the calibrated adjustable resistance producing means may indicate the total rate of flow through said shunt and main lines so long as the proportioning means is open and means actuated by said pressure differential responsive means to indicate the total flow when the proportioning means is shut.

2. A meter for metering the rate of flow of a fluid in a conduit comprising in combination, a main pipe line, a line containing pressure differential producing means connected in shunt thereto, adjustable means to produce a variable resistance in said main line between the terminals of said shunt line to proportion the flow between said shunt and main lines calibrated to indicate the flow in said shunt and main lines, means responsive to the pressure differential produced in said shunt line, and means actuated justable means to control the rate of flow connected to said conduit to assist in the calibration of said meter.

7. A meter for metering the rate of flow of fluid in a conduit comprising, in combination, a main pipe line, a line containing a Venturi meter tube connected in shunt thereto, an adjustable flow proportioning valve in said main line between the terminals of said shunt line to proportion the flow between said shunt and main lines calibrated to indicate the flow in said shunt and main lines, a manometer connected to the inlet and throat of said Venturi tube to indicate the pressure differential produced in said shunt line and consequently the rate of flow through the shunt line whereby the adjustable flow proportioning valve may be calibrated to indicate, so long as the proportioning valve is open, either the proportion of flow through said shunt and main lines or the total rate of flow in said shunt and main lines so long as the shunt differential is maintained at a predetermined constant, an adjustable calibrating valve connected to said main line in series with said flow proportioning valve, a manometer having its terminals connected to said conduit on opposite sides of said calibrating valve and adjustable flow controlling means connected to said conduit in series with said flow proportioning and calibrating valves to assist in the calibration of said meter.

8. In combination, a conduit, a proportionate meter comprising a main line containing a variable resistance, a bypass line connected to said conduit across said variable resistance containing a calibrated differential producer, said meter having means to indicate the flow of fluid through the conduit and means in said conduit in series with said variable resistance and bypass to be used in the calibration of said meter.

9. In combination, a conduit, a proportionate meter comprising a main line containing a proportioning valve, a by-pass line connected to said conduit across said proportioning valve containing a calibrated differential producer, said meter having means to indicate the flow of fluid through the conduit and means in said conduit in series with said proportioning valve and bypass to be used in the calibration of said meter, comprising an adjustable controlling valve in said conduit above said proportioning valve and bypass, an adjustable calibrating valve in said conduit below said proportioning valve and bypass and a pressure differential indicating means attached to said conduit across said calibrating valve.

10. A meter for metering the rate of flow of fluid in a conduit, comprising in combination, a main pipe line, a line containing pressure differential producing means connected in shunt thereto, a proportioning valve to produce a variable resistance in said main line between the terminals of said shunt line to proportion the flow between said shunt and main lines calibrated to indicate the flow in said shunt and main lines, means to indicate the pressure differential produced in said shunt line, whereby the adjustable flow proportioning valve may be calibrated to indicate, so long as the proportioning valve is open, either the proportion of flow through said shunt and main lines or the total rate of flow in said shunt and main lines, so long as the shunt differential is maintained at a predetermined constant, an adjustable calibrating valve connected to said main line in series with said flow proportioning valve, pressure differential responsive means having its terminals connected to said conduit on opposite sides of said calibrating valve and a controlling valve attached within said conduit to assist in the calibration of said meter.

11. The herein described improved method of calibrating a proportionate flow meter as claimed in claim 10 which comprises adjusting the calibrating valve to produce a known rate of flow through the shunt tube, the proportioning valve being shut; doubling the rate of flow through the shunt tube by adjusting the calibrating and controlling valves, halving the flow in said shunt tube by opening the proportioning valve and observing the amount of opening of said proportioning valve; again doubling the rate of flow through said shunt tube by adjusting the calibrating and controlling valves, then further opening the proportioning valve to halve the amount of flow through the shunt line and again noting the amount of opening of said proportioning valve; and repeating said operations whereby the observed angles of opening of said proportioning valve may indicate the proper multipliers to be used with the differential produced in the shunt tube to give the total amount of flow and the calibration of the proportioning valve may depend only on the known relation between the shunt meter differential and the rate of flow through the shunt meter.

12. The herein described improved method of calibrating a proportionate flow meter as claimed in claim 10 which comprises adjusting the calibrating valve to produce a known rate of flow through the shunt tube, the proportioning valve being shut; increasing in a known ratio the rate of flow through the shunt tube by adjusting the calibrating and controlling valves decreasing in a known ratio the flow in said shunt tube by opening the proportioning valve and observing the amount of opening of said proportioning valve; again increasing in a known ratio the rate of flow through said shunt tube by adjusting the calibrating and controlling by said pressure differential responsive means to automatically adjust said flow proportioning means to regulate the resistance in said main line to produce a constant differential in the shunt line whereby the calibrated adjustable resistance producing means may indicate the total rate of flow through said shunt and main lines so long as the proportioning means is open.

3. A meter for metering the rate of flow of a fluid in a conduit comprising in combination, a main pipe line, a line containing a Venturi meter tube connected in shunt thereto, an adjustable valve in said main line between terminals of said shunt line to proportion the flow between said shunt and main lines calibrated to indicate the flow in said shunt and main lines, a U-tube manometer attached to the inlet and throat of said Venturi tube, a float actuated by the height of liquid in one leg thereof and hydraulic means to actuate said proportioning valve including a pilot valve, means connecting said float and pilot valve to cause a reversal of flow in said pilot valve, a cylinder, pipes connecting each end of said cylinder with opposite ends of said pilot valve, a fluid actuated piston reciprocal in said cylinder controlled in its action by said pilot valve having means attached thereto to actuate the proportioning valve to maintain a constant rate of flow in the shunt tube whereby the calibrated proportioning valve may indicate the total rate of flow through said shunt and main lines so long as the proportioning valve is open.

4. A meter for metering the rate of flow of a fluid in a conduit comprising in combination, a main pipe line, a line containing pressure differential producing means connected in shunt thereto, adjustable means to produce a variable resistance in said main line between the terminals of said shunt line to proportion the flow between said shunt and main lines calibrated to indicate the flow in said shunt and main lines, means responsive to the pressure differential produced in said shunt line, means actuated by said pressure differential responsive means to automatically adjust said flow proportioning means to regulate the resistance in said main line to produce a constant differential in the shunt line whereby the calibrated adjustable resistance producing means may indicate the total rate of flow through said shunt and main lines so long as the proportioning means is open, means to produce an adjustable resistance connected to said conduit in series with said flow proportioning variable resistance producing means, pressure differential indicating means having its terminals connected to said conduit on opposite sides of said variable resistance and adjustable means to control the rate of flow through said conduit and connected thereto in series with both said adjustable resistance producing means to assist in the calibration of said meter.

5. A meter for metering the rate of flow of a fluid in a conduit comprising in combination, a main pipe line, a line containing a Venturi meter tube connected in shunt thereto, an adjustable valve in said main line between terminals of said shunt line to proportion the flow between said shunt and main lines calibrated to indicate the flow in said shunt and main lines, a U-tube manometer attached to the inlet and throat of said Venturi tube, a float actuated by the height of liquid in one leg thereof and hydraulic means to actuate said proportioning valve, including a pilot valve, means connecting said float and pilot valve to cause a reversal of flow in said pilot valve, a cylinder, pipes connecting each end of said cylinder with opposite ends of said pilot valve, a fluid actuated piston reciprocal in said cylinder controlled in its action by said pilot valve having means attached thereto to actuate the proportioning valve to maintain a constant rate of flow in the shunt tube whereby the calibrated proportioning valve may indicate the total rate of flow through said shunt and main lines so long as the proportioning valve is open, and an adjustable calibrating valve connected to said main line in series with said flow proportioning valve, a manometer having its terminals connected to said conduit on opposite sides of said calibrating valve and adjustable flow controlling means connected to said conduit in series with said flow proportioning and calibrating valves to assist in the calibration of said meter.

6. A meter for metering the rate of flow of fluid in a conduit comprising a combination, a main pipe line, a line containing pressure differential producing means connected in shunt thereto, adjustable means to produce a variable resistance in said main line between the terminals of said shunt line to proportion the flow between said shunt and main lines calibrated to indicate the flow in said shunt and main lines and means to indicate the pressure differential produced in said shunt line whereby the adjustable flow proportioning means may be calibrated to indicate, so long as the proportioning means is open, either the proportion of flow through said shunt and main lines or the total rate of flow in said shunt and main lines so long as the shunt differential is maintained at a predetermined constant, means to produce an adjustable resistance connected to said conduit in series with said flow proportioning variable resistance producing means, pressure differential responsive means having its terminals connected to said conduit on opposite sides of said variable resistance and advalves, then further opening the proportioning valve to decrease in a known ratio the amount of flow through the shunt line and again noting the amount of opening of said proportioning valve; and repeating said operations whereby the observed angles of opening of said proportioning valve may indicate the proper multipliers to be used with the d'fferential produced in the shunt tube to give the total amount of flow and the calibration of the proportioning valve may depend only on the known relation between the shunt meter differential and the rate of flow through the shunt meter.

In testimony whereof I affix my signature.

FREDERICK N. CONNET.